United States Patent Office 2,943,093
Patented June 28, 1960

2,943,093

PROCESS OF PURIFYING TRYPTAMINE COMPOUNDS AND PRODUCTS OBTAINED THEREBY

Robert Joly, Montmorency, and Robert Bucourt, Villiers-le-Bel, France, assignors to Les Laboratoires Francais de Chimiotherapie, Paris, France, a French body corporate No Drawing. Filed Apr. 11, 1958, Ser. No. 727,781

Claims priority, application France Aug. 2, 1957

12 Claims. (Cl. 260—319)

The present invention relates to a simple and effective process of purifying tryptamine compounds and to new products obtained in the course of said purification process and more particularly to tryptamine salts of substituted N-tryptamino carboxylic acid.

Substituted tryptamine compounds are prepared in general by a reduction of the corresponding substituted indolyl acetonitrile compounds or by recarboxylation of the corresponding substituted tryptamine 2-carboxylic acid compounds. The purification of said crude tryptamine compounds is rather burdensome. As these compounds are used as starting materials in the synthesis of physiologically active compounds, for instance, of serotonine and alkaloids of the reserpine series, it is evident that a simple and effective purification method for such tryptamine compounds is of considerable importance in the industrial production of such physiologically active compounds.

Therefore, it is one object of the present invention to provide a simple and effective process of purifying tryptamine compounds.

Another object of the present invention is to provide tryptamine salts of N-tryptamino carboxylic acids which are valuable intermediates in the purification of crude tryptamine compounds.

Other objects of the present invention and advantageous features thereof will become apparent as the description proceeds.

According to the present invention crude tryptamine compounds of the general Formula I

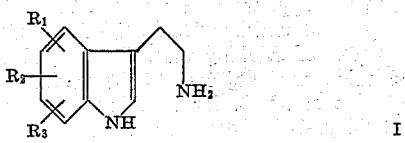

wherein $R_1$, $R_2$, and $R_3$ represent members selected from the group consisting of hydrogen, halogen, a lower alkyl radical, an aryl lower alkyl radical, and a lower alkoxy group, are purified by subjecting them to the action of gaseous carbon dioxide in a suitable organic solvent. The compounds formed thereby which are stable at room temperature consist of a comibnation of 2 moles of the tryptamine compound and 1 mole of carbon dioxide according to elementary analysis. Thus, said addition products represent apparently the tryptamine salt of the N-tryptamino carboxylic acid of Formula II

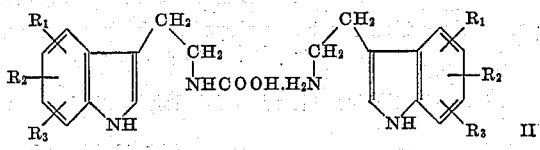

wherein $R_1$, $R_2$, and $R_3$ represent the same members as indicated hereinabove.

Such tryptamine salts of N-tryptamine carboxylic acid are readily decomposed on heating whereby gaseous carbon dioxide is split off and the tryptamine compound is recovered in a pure state. Solvents, which are especially suitable for the purification process according to the present invention are solvents that do not dissolve said tryptamine salts of N-tryptamino carboxylic acids, but that, at the same time, dissolve impurities. For instance, absolute ethanol, 95% ethanol, and methylene chloride are the preferred solvents in the present purification process although the invention is not limited thereto.

In order to carry out the process according to the present invention, the crude tryptamine compound of Formula I is dissolved in ethanol or methylene chloride and gaseous carbon dioxide is passed through the solution which, if necessary, is cooled so as to maintain the temperature of the reaction mixture below 40–45° C. Introduction of carbon dioxide is continued until all of the tryptamine compound is precipitated in the form of the new addition compound. It is then sufficient to separate the resulting compound from the reaction mixture by filtration and to decompose the same by heating, preferably in an inert solvent, for instance, toluene, xylene, tetrahydronaphthalene, or decahydronaphthalene to a temperature above 80° C. Decomposition and splitting off of carbon dioxide is preferably carried out in a thin layer and in a vacuum or at atmospheric pressure. On cooling, the tryptamine compound of Formula I crystallizes in the pure state.

The following examples serve to illustrate the present invention without, however, limiting the same thereto. More particularly, the production of the insoluble compound of 2 moles of the tryptamine compound and 1 mole of carbon dioxide may be carried out in accordance with the principles set forth herein and in the claims annexed hereto, in other solvents than those mentioned hereinabove if the reaction products are sufficiently insoluble in said solvents, and by using other inert solvents than those mentioned hereinabove for the decomposition of the reaction products.

The melting points given in the examples are instantaneous melting points determined on the Maquenne block.

EXAMPLE 1

*Purification of 6-methoxy tryptamine.*

40.2 g. of 6-methoxy tryptamine prepared according to Akabovi and Saito (Ber. dtsch. chem. Ges., vol. 63 (1930), p. 2247) are dissolved in 320 cc. of absolute ethanol at 40° C. If necessary, the solution is decolorized by treatment with decolorizing carbon. Gaseous carbon dioxide is passed through the solution while cooling to such an extent that the temperature during reaction does not exceed 40° C. The reaction is quite exothermic. After passing carbon dioxide through the solution at 40° C. for 20 minutes, the reaction mixture is cooled to about +5° C. and introduction of carbon dioxide is continued at said temperature for 30 more minutes. The precipitated compound is filtered with suction, washed with absolute alcohol, and dried in the open air at 40–45° C. 42 g. (93.5% of the theoretical amount) of the new compound melting at 150–155° C. (with decomposition) are obtained. The colorless, well crystallized product is insoluble in absolute alcohol, acetone, and ether, slightly soluble in water, and soluble in methanol.

*Analysis.*—$C_{23}H_{28}O_4N_4$; molecular weight=424.49. Calculated: 65.07% C; 6.65% H; 13.2% N; 15.08% O. Found: 65.0% C; 6.7% H; 13.2% N; 15.2% O.

The same compound is obtained when working in 95% alcohol. The new compound has not yet been described in the literature.

In order to recover 6-methoxy tryptamine therefrom, 41.4 g. of said compound are refluxed with mechanical stirring in 800 cc. of toluene until dissolution is complete. This requires only a few minutes. A small amount of the toluene is then distilled off in order to remove traces of alcohol and/or water which may have been retained by the starting material. On cooling to room temperature, 6-methoxy tryptamine crystallizes. After standing for about 1 hour, the crystals are filtered with suction, washed with water, and dried. 35.5 g. of pure 6-methoxy tryptamine melting at 145–146° C. are obtained. The yield corresponds to a total yield of 90% of the theoretical amount.

The same result is achieved when heating the addition compound in a vacuum at 90° C. in the absence of a solvent.

EXAMPLE 2

Purification of 5-methoxy tryptamine 5-methoxy tryptamine is prepared according to Spaeth and Lederer (Ber. dtsch. chem. Ges., vol. 63 (1930), p. 2108). The crude compound is dissolved in methylene chloride and treated with carbon dioxide as described in Example 1. The reaction product is dried at 20° C. It is well crystallized, insoluble in water, slightly soluble in alcohol, and very slightly soluble in chloroform. Its melting point is 114° C. (with decomposition). It is solvated with about 1% of methylene chloride.

Analysis.—$C_{23}H_{28}O_4N_4$; molecular weight = 424.49.
Calculated: 65.07% C; 6.65% H; 15.08% O; 13.20% N.
Found: 64.7% C; 6.8% H; 14.6% O; 13.2% N; 0.9% Cl.
Calculated for solvent-free compound: 65.26% C; 6.86% H; 14.77% O; 13.30% N.

The compound has not yet been described in the literature.

On heating said compound to about 90° C., 5-methoxy tryptamine melting at 120° C. is recovered in the pure state.

EXAMPLE 3

Purification of 7-methoxy tryptamine

The purification process according to Example 1 is applied to 7-methoxy tryptamine prepared according to Spaeth and Lederer (Ber. dtsch. chem. Ges., vol. 63 (1930), p. 2108) using methylene chloride as solvent. The resulting reaction compound is well crystallized, insoluble in water and very slightly soluble in chloroform. It melts at 125° C. (with decomposition). The compound is solvated with 3.3% of methylene chloride.

Analysis. — $C_{23}H_{28}O_4N_4$; molecular weight = 424.49.
Calculated: 65.07% C; 6.65% H; 15.08% O; 13.20% N.
Found: 63.3% C; 6.6% H; 14.9% O; 12.6% N; 2.8% Cl.
Calculated for the solvent-free compound: 64.94% C; 6.76% H; 15.38% O; 13.02% N.

The compound has not yet been described in the literature.

On heating the compound to about 90° C., 7-methoxy tryptamine with a melting point of 135° C. is recovered in the pure state.

EXAMPLE 4

Purification of 5-chloro tryptamine.

5-chloro tryptamine is prepared according to Abramovitch, J. Chem. Soc. 1956, p. 4600. It is dissolved in methylene chloride and subjected to the action of gaseous carbon dioxide as described in Example 1. The resulting compound is well crystallized, slightly soluble in alcohol, and very slightly soluble in chloroform. It has a melting point of 115° C. (with decomposition) and is solvated with about 1% methylene chloride.

Analysis.—$C_{21}H_{22}O_2N_4Cl_2$; molecular weight=433.34.
Calculated: 58.22% C; 5.12% H; 7.29% O; 12.93% N; 16.37% Cl. Found: 57.9% C; 5.3% H; 7.4% O; 12.6% N; 17.1% Cl.
Calculated for the solvent-free compound: 58.3% C; 5.3% H; 7.5% O; 12.7% N; 16.4% Cl.

The compound has not yet been described in the literature.

On heating the compound to about 90° C., 5-chloro tryptamine is recovered in the pure state.

EXAMPLE 5

Purification of tryptamine

Crude tryptamine is dissolved in methylene chloride and treated with gaseous carbon dioxide as described in Example 1. The resulting compound, which is obtained in a quantitative yield, is well crystallized, colorless, insoluble in water and chloroform, and slightly soluble in alcohol. It has a melting point of 120° C. (with decomposition).

Analysis.—$C_{21}H_{24}O_2N_4$; molecular weight=364.43.
Calculated: 69.21% C; 6.64% H; 8.78% O; 15.38% N.
Found: 69.2% C; 6.6% H; 8.3% O; 15.7% N.

On heating, tryptamine is recovered in the pure state, of the melting point 115–116° C.

EXAMPLE 6

Purification of 6-methoxy-7-chloro tryptamine

Crude 6-methoxy-7-chloro tryptamine obtained according to copending commonly assigned application Serial No. 727,777, filed April 11, 1958, and entitled, "20α-Yohimbane Compounds and a Process of Making Same," is dissolved in methylene chloride and gaseous carbon dioxide is passed through the solution for 30 minutes while cooling in an ice box. The precipitated crystals are filtered with suction and washed with methylene chloride. The 6-methoxy-7-chloro tryptamine salt of N-(6-methoxy-7-chloro) tryptamino carboxylic acid is obtained in a yield of 60% of the theoretical amount. It melts at 145–147° C.

In order to recover therefrom pure 6-methoxy-7-chloro tryptamine, the tryptoamino carboxylate is dissolved in toluene and the solution is refluxed for 30 minutes in a nitrogen atmosphere. After filtration, while hot, the solution is allowed to stand for 2 hours for crystallization. The precipitated crystals are filtered with suction, washed and dried in a vacuum. 6-methoxy-7-chloro tryptamine is recovered in a yield of 50%.

The pure 6-methoxy-7-chloro tryptamine melts at 149° C.

EXAMPLE 7

Purification of 4-chloro-7-methoxy tryptamine

Crude 4-chloro-7-methoxy tryptamine obtained according to the process described in copending commonly assigned application Serial No. 727,777, filed April 11, 1958, and entitled "20α-Yohimbane Compounds and a Process of Making Same," is dissolved in methylene chloride and subjected to the action of gaseous carbon dioxide at 5° C. for 30 minutes. The precipitated N-(4-chloro-7-methoxy tryptamino carboxylate of 4-chloro-7-methoxy tryptamine is filtered with suction, washed with methylene chloride, and dried. The new compound melts at 115–120° C. (with decomposition).

In order to recover therefrom 4-chloro-7-methoxy tryptamine, the compound is suspended in toluene and refluxed for 30 minutes in a nitrogen atmosphere. After cooling in an ice bath, the precipitated crystals are filtered with suction, washed with toluene, and dried. The resulting pure 4-chloro-7-methoxy tryptamine melting at 156° C. is identical with the compound described in the above mentioned copending application.

Of course, the purification process according to the present invention can be employed in the preparation of other tryptamine compounds in the pure state.

We claim:

1. The tryptamine salt of β-(3-indolyl)-ethyl carbamic acid.
2. The 5-methoxy tryptamine salt of β-[3-(5-methoxy)-indolyl]-ethyl-carbamic acid.
3. The 6-methoxy tryptamine salt of β-[3-(6-methoxy)-indolyl]-ethyl-carbamic acid.

4. The 7-methoxy tryptamine salt of β-[3-(7-methoxy)-indolyl]-ethyl-carbamic acid.

5. The 5-chloro tryptamine salt of β-[3-(5-chloro)-indolyl]-ethyl-carbamic acid.

6. The 6-methoxy-7-chloro tryptamine salt of β-[3-(6-methoxy-7-chloro)-indolyl]-ethyl-carbamic acid.

7. The 4-chloro-7-methoxy tryptamine salt of β-[3-(4-chloro-7-methoxy)-indolyl]-ethyl-carbamic acid.

8. The carboxylic acid compound of the formula

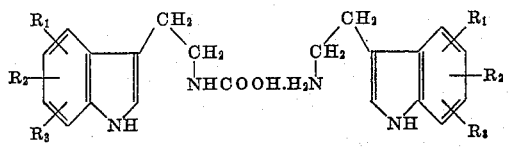

wherein $R_1$, $R_2$, and $R_3$ are members selected from the group consisting of hydrogen, halogen, and a lower alkoxy group.

9. In the process of purifying tryptamine compounds selected from the formula

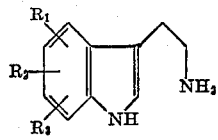

wherein $R_1$, $R_2$ and $R_3$ are members selected from the group consisting of hydrogen, halogen, and a lower alkoxy group, the steps comprising dissolving the crude tryptamine compound in an organic solvent selected from the group consisting of absolute ethanol, 95% aqueous ethanol, and methylene chloride, passing gaseous carbon dioxide through the solution while keeping the temperature below 45° C., separating the precipitated carboxylic acid compound by filtration from the reaction mixture, and heating the separated compound to cause splitting off of carbon dioxide.

10. The process according to claim 9, wherein the carboxylic acid compound is decomposed by heating in an inert solvent selected from the group consisting of toluene, decahydronaphthalene, tetrahydronaphthalene, and xylene at a temperature above 80° C.

11. The process according to claim 9, wherein the carboxylic acid compound is decomposed by heating to a temperature above 90° C. in a thin layer at atmospheric pressure.

12. The process according to claim 11, wherein the carboxylic acid compound is heated in a vacuum.

References Cited in the file of this patent
FOREIGN PATENTS
770,370    Great Britain _____ Mar. 20, 1957

OTHER REFERENCES

Murphy, Jour. Am. Pharm. Assoc., vol. 32, pp. 83–89 (1943).

Beilstein: Hand. Org. Chem., vol. XXII, 2nd supplement, p. 347.

UNITED STATES PATENT OFFICE
CERTIFICATION OF CORRECTION

Patent No. 2,943,093            June 28, 1960

Robert Joly et al.

It is hereby certified that error appears in the above numbered patent requiring correction and that the said Letters Patent should read as corrected below.

Column 1, line 23, for "recarboxylation" read -- decarboxylation --.

Signed and sealed this 18th day of July 1961.

(SEAL)
Attest:

ERNEST W. SWIDER
Attesting Officer

DAVID L. LADD
Commissioner of Patents